(12) United States Patent
Han et al.

(10) Patent No.: US 10,365,098 B2
(45) Date of Patent: Jul. 30, 2019

(54) TERMINAL DEVICE

(71) Applicant: Huawei Technologies Co., Ltd., Shenzhen (CN)

(72) Inventors: Quancheng Han, Shenzhen (CN); Wei Wang, Beijing (CN); Baicai Wang, Beijing (CN); Zhengping Tan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/751,755

(22) PCT Filed: Jun. 29, 2016

(86) PCT No.: PCT/CN2016/087729
§ 371 (c)(1),
(2) Date: Feb. 9, 2018

(87) PCT Pub. No.: WO2017/024906
PCT Pub. Date: Feb. 16, 2017

(65) Prior Publication Data
US 2018/0238684 A1    Aug. 23, 2018

(30) Foreign Application Priority Data
Aug. 10, 2015 (CN) .......................... 2015 1 0487748

(51) Int. Cl.
*G01B 21/22* (2006.01)
*H04M 1/24* (2006.01)
(Continued)

(52) U.S. Cl.
CPC ........... *G01B 21/22* (2013.01); *G06F 1/1686* (2013.01); *H01R 13/6205* (2013.01);
(Continued)

(58) Field of Classification Search
None
See application file for complete search history.

(56) References Cited

U.S. PATENT DOCUMENTS

| 2005/0052526 A1 | 3/2005 | Kim |
| 2008/0100713 A1 | 5/2008 | Liu |

(Continued)

FOREIGN PATENT DOCUMENTS

| CN | 203301580 U | 11/2013 |
| CN | 104023105 A | 9/2014 |
| CN | 104243826 A | 12/2014 |

OTHER PUBLICATIONS

Machine Translation and Abstract of Chinese Publication No. CN104023105, Sep. 3, 2014, 15 pages.
(Continued)

*Primary Examiner* — William B Perkey
(74) *Attorney, Agent, or Firm* — Conley Rose, P.C.

(57) ABSTRACT

A terminal device having a rotatable image capture component, including a magnetic body and a sensor. A change in the magnetic flux caused by rotation of the magnetic body is identified by the sensor, and used to identify whether the image capture component is in a front-facing state or a rear-facing state. The magnetic body is mounted in a connector of the image capture component or at an end of the connector. The sensor is mounted on a circuit board using a bottom surface perpendicular to a Z-axis of the sensor. When the image capture component is at a front-facing position and a rear-facing position, an angle between a connection line, which connects a south pole and a north pole of the magnetic body, and a radial line of an image capture unit included in the image capture component is less than a preset value in a rotation direction.

8 Claims, 7 Drawing Sheets

(51) Int. Cl.
*H01R 13/62* (2006.01)
*H01R 35/04* (2006.01)
*H04N 5/225* (2006.01)
*G03B 17/02* (2006.01)
*H04M 1/02* (2006.01)
*G06F 1/16* (2006.01)

(52) U.S. Cl.
CPC .......... *H01R 35/04* (2013.01); *H04M 1/0264* (2013.01); *H04M 1/24* (2013.01); *H04N 5/2252* (2013.01); *H04N 5/2253* (2013.01); *H04M 2250/20* (2013.01); *H04N 5/2251* (2013.01)

(56) References Cited

U.S. PATENT DOCUMENTS

2008/0278908 A1* 11/2008 Wang ..................... G03B 17/00 361/679.26
2009/0296328 A1* 12/2009 Lin ....................... G06F 1/1616 361/679.02
2018/0238684 A1* 8/2018 Han ..................... H04M 1/0264
2018/0267663 A1* 9/2018 Cho ..................... G06F 3/0416

OTHER PUBLICATIONS

Machine Translation and Abstract of Chinese Publication No. CN104243826, Dec. 24, 2014, 20 pages.
Machine Translation and Abstract of Chinese Publication No. CN203301580, Nov. 20, 2013, 7 pages.
Foreign Communication From a Counterpart Application, PCT Application No. PCT/CN2016/087729, English Translation of International Search Report dated Aug. 19, 2016, 2 pages.
Foreign Communication From a Counterpart Application, PCT Application No. PCT/CN2016/087729, English Translation of Written Opinion dated Aug. 19, 2016, 8 pages.
Foreign Communication From a Counterpart Application, European Application No. 16834530.4, Extended European Search Report dated Jul. 4, 2018, 9 pages.

* cited by examiner

OUT1

OUT2

TERMINAL DEVICE

CROSS-REFERENCE TO RELATED APPLICATIONS

This application is a U.S. National Stage of International Patent Application No. PCT/CN2016/087729 filed on Jun. 29, 2016, which claims priority to Chinese Patent Application No. 201510487748.3 filed on Aug. 10, 2015. Both of the aforementioned applications are hereby incorporated by reference in their entireties.

TECHNICAL FIELD

The present disclosure relates to a terminal device, and in particular, to a terminal device having a rotatable image capture component.

BACKGROUND

A conventional terminal device is generally provided with a front-facing camera and a rear-facing camera that are used to capture images. The front-facing camera, also referred to as a secondary camera, is disposed on a front surface (for example, a side with a display screen) of the terminal device, and has relatively poor performance. The rear-facing camera, also referred to as a primary camera, is disposed on a rear surface of the terminal device, has relatively good performance, and is an image capture unit more frequently used.

In recent years, a terminal device provided with only one rotatable camera is invented. The camera is rotatable relative to the terminal device. When in a front-facing state, the camera is used as a front-facing camera, and when in a rear-facing state, the camera is used as a rear-facing camera. After the camera finishes capturing an image, a processor needs to determine whether the camera is in a front-facing state or a rear-facing state. Because when the camera is rotated to be in a front-facing state, a control unit needs to give an instruction of rotating the image 180°. An upright image can be output only in this way.

Therefore, it is very necessary for the terminal device to determine whether the rotatable camera is in a front-facing state or a rear-facing state. However, the rotatable camera disposed on the terminal device occupies partial structure space of the terminal device. Moreover, there is a tendency of making the terminal device ultrathin in recent years. As a result, the structure space of the terminal device is further reduced. In this case, how to dispose an apparatus used to identify a state of the rotatable camera in limited structure space becomes a problem for designers.

SUMMARY

Embodiments of the present disclosure provide a terminal device having a rotatable image capture component. An apparatus for identifying whether the image capture component is in a front-facing state or a rear-facing state may be disposed in limited structure space of the terminal device.

According to a first aspect, an embodiment of the present disclosure provides a terminal device, including a device housing, a circuit board disposed in the device housing, an image capture component, where the image capture component includes an image capture unit, and the image capture unit is configured to capture image data, and an end of the image capture component has a connector, the connector is pivotally connected to the device housing, and the image capture component is rotatable between a rear-facing position and a front-facing position relative to the device housing using the connector, a magnetic body, where the magnetic body includes a south pole and a north pole, and is disposed in the connector or at an end of the connector, a sensor, where the sensor is mounted on the circuit board, disposed spaced from the sensor, and capable of sensing magnetic flux generated when the magnetic body is rotated and outputting a preset signal based on the magnetic flux, and a control unit, where the control unit is electrically connected to the image capture component and the sensor, and configured to determine, according to the preset signal output by the sensor, whether the image capture component is in a rear-facing state or a front-facing state, where the sensor is mounted on the circuit board using a bottom surface perpendicular to a Z-axis of the sensor. The magnetic body is on an extended plane of a plane on which the sensor is located, when the image capture component is at the front-facing position and the rear-facing position, an angle between a connection line, which connects the south pole and the north pole of the magnetic body, and a radial line of the image capture unit is less than a preset value in a rotation direction.

In a first possible implementation of the first aspect, the sensor sets a first threshold and a second threshold, and the sensor outputs the preset signal based on a relationship between the magnetic flux generated by the magnetic body and the two thresholds the first threshold and the second threshold.

With reference to the first possible implementation of the first aspect, in a second possible implementation, the sensor includes a first output terminal and a second output terminal, and that the sensor outputs the preset signal based on a relationship between the magnetic flux generated by the magnetic body and the two thresholds, the first threshold and the second threshold includes outputting, by the first output terminal of the sensor, a first level when the magnetic flux generated by the magnetic body is greater than or equal to the first threshold, and outputting, by the second output terminal of the sensor, a second level when the magnetic flux generated by the magnetic body is less than or equal to the second threshold.

With reference to the second possible implementation of the first aspect, in a third possible implementation, that the control unit determines, according to the preset signal output by the sensor, whether the image capture component is in a rear-facing state or a front-facing state includes that the control unit determines that the image capture component is in the front-facing state when identifying the first level output by the first output terminal of the sensor.

With reference to the second possible implementation of the first aspect, in a fourth possible implementation, that the control unit determines, according to the preset signal output by the sensor, whether the image capture component is in a rear-facing state or a front-facing state includes that the control unit determines that the image capture component is in the rear-facing state when identifying the second level output by the second output terminal of the sensor.

With reference to any one of the first aspect or the first to the fourth possible implementations of the first aspect, in a fifth possible implementation, when the image capture component is in the front-facing state, the control unit is further configured to give an image-rotating instruction.

With reference to any one of the first to the fourth possible implementations of the first aspect, in a sixth possible implementation, the sensor is a bipolar Hall sensor.

With reference to any one of the first aspect or the first to the sixth possible implementations of the first aspect, in a seventh possible implementation, the sensor is mounted on the circuit board using a pad.

According to a second aspect, an embodiment of the present disclosure provides a camera state switching method, applied to a terminal device having a camera, where the terminal device further includes a device housing, an image capture component, a magnetic body, and a sensor capable of sensing magnetic flux generated when the magnetic body is rotated, where the image capture component includes an image capture unit, and the image capture unit is configured to capture image data. An end of the image capture component has a connector, the connector is pivotally connected to the device housing, and the image capture component is rotatable between a rear-facing position and a front-facing position relative to the device housing using the connector. The magnetic body is disposed in the connector or at an end of the connector, and the method includes sensing, using the sensor, the magnetic flux generated when the magnetic body is rotated, and outputting a preset signal based on the magnetic flux, and determining, according to the preset signal output by the sensor, whether the image capture component is in a rear-facing state or a front-facing state.

Based on a same inventive concept, for a problem resolving principle of the method, refer to the first aspect and the possible implementations of the first aspect. Therefore, for implementation of the method, refer to implementation of the first aspect and the possible implementations of the first aspect. Details are not described herein again.

According to the embodiments of the present disclosure, a change in magnetic flux caused by rotation of a magnetic body is identified by a sensor, and may be used to identify whether an image capture component is in a front-facing state or a rear-facing state. In addition, the magnetic body is mounted in a connector or at an end of the connector. The sensor is mounted on a circuit board using a bottom surface perpendicular to a Z-axis of the sensor. When the image capture component is at a front-facing position and a rear-facing position, an angle between a connection line, which connects a south pole and a north pole of the magnetic body, and a radial line of an image capture unit is less than a preset value in a rotation direction. Structure space needed is relatively small in such a disposing manner, thereby resolving a difficult problem of disposing, in limited structure space of a terminal device, an apparatus configured to identify a state of an image-rotating component.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Embodiment 1

This embodiment of the present disclosure relates to a terminal device having a rotatable image capture component. The terminal device may be a mobile phone, a tablet computer, a personal digital assistant (PDA), or the like. The mobile phone is used as an example for the description below in this embodiment of the present disclosure. However, it should be noted that this does not constitute any limitation to this embodiment of the present disclosure.

Figure 1:
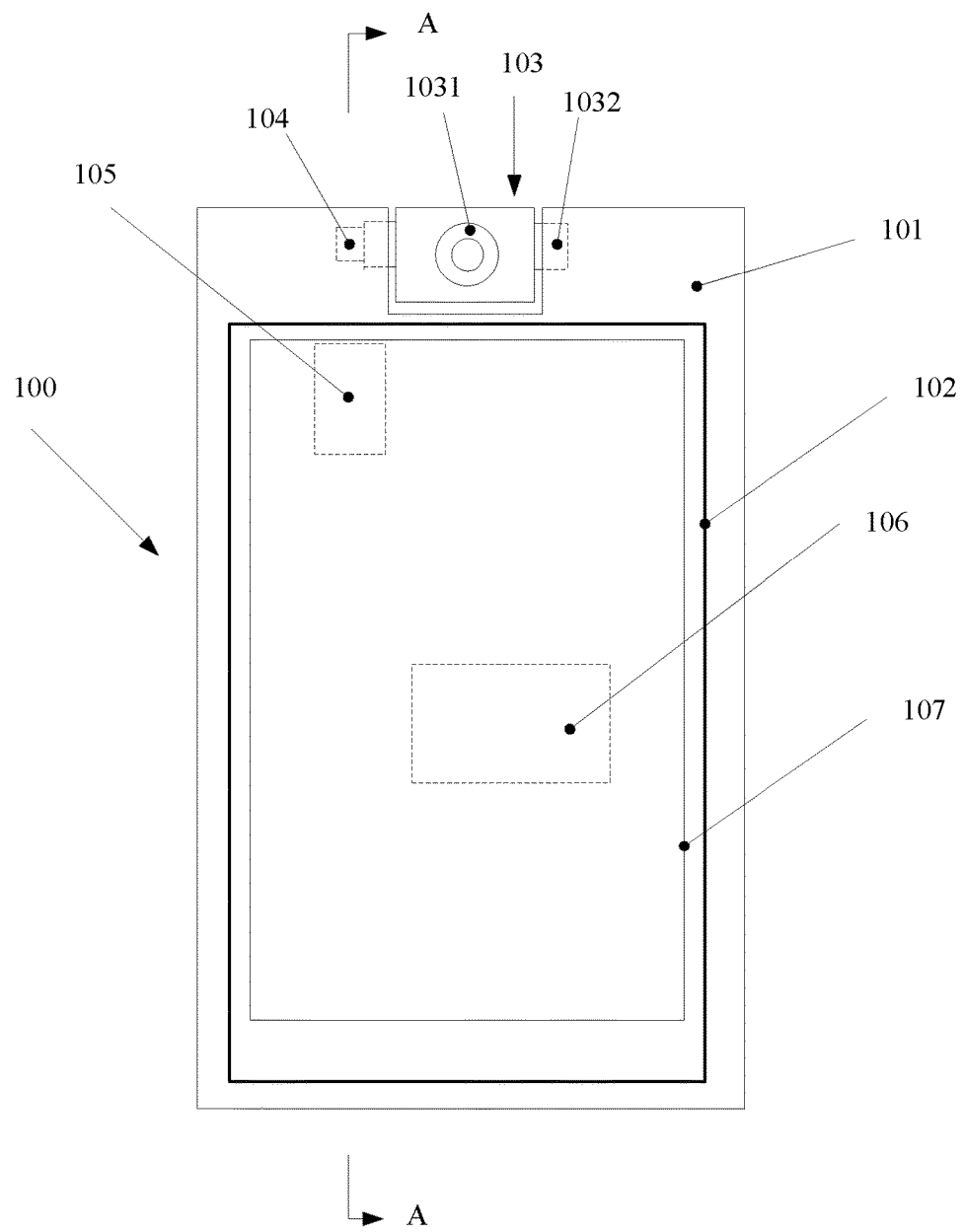
FIG. 1 is a schematic structural diagram of a terminal device according to Embodiment 1.
Figure 2:
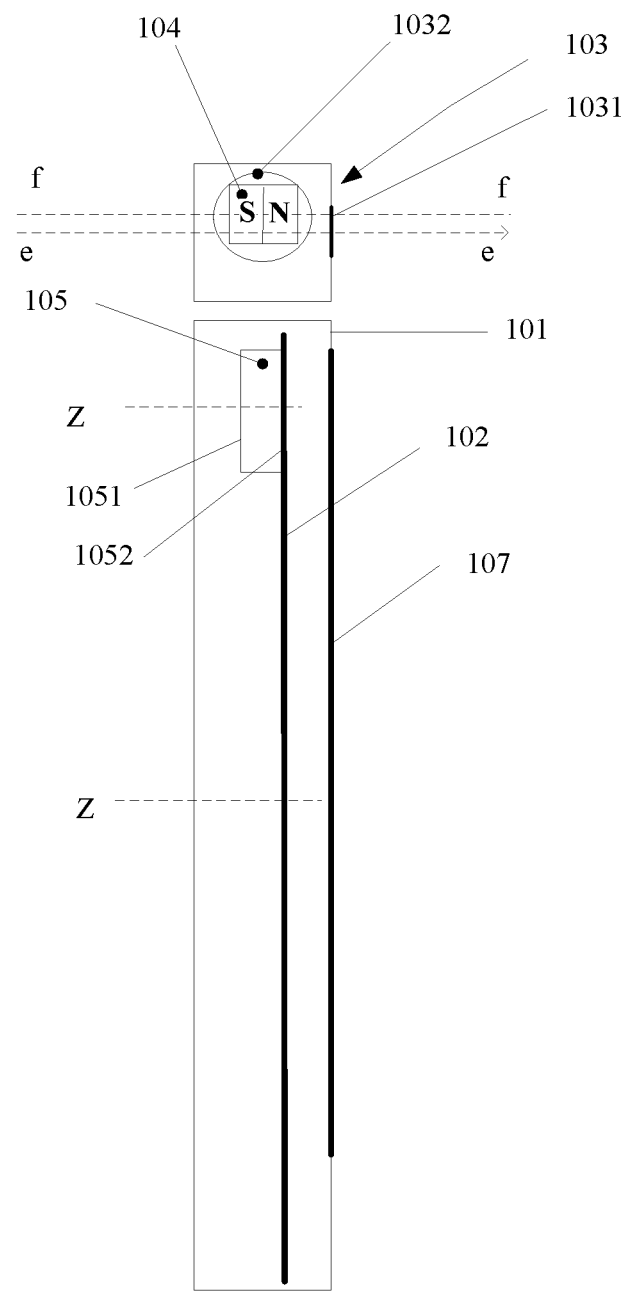
FIG. 2 is a cross-sectional view of the terminal device in FIG. 1 along an A-A direction.

As shown in FIG. 1 and FIG. 2, a mobile phone 100 includes a mobile phone housing 101, a circuit board 102, an image capture component 103, a magnetic body 104, a sensor 105, and a control unit 106.

The mobile phone housing 101, where the circuit board 102 is disposed in the mobile phone housing 101.

The image capture component 103 includes an image capture unit 1031 configured to capture image data, such as a camera. Referring to FIG. 1, an end of the image capture component 103 has a connector 1032. The connector 1032 is pivotally connected to the mobile phone housing 101. In this way, the image capture component 103 is rotatable relative to the mobile phone housing 101 using the connector 1032. Preferably, the connector 1032 may include a rotating shaft having a circular cross section.

Referring to FIG. 1, the magnetic body 104 is disposed at an end of the connector 1032, and the sensor 105 is mounted on the circuit board 102. Referring to FIG. 2, the sensor 105 is preferably mounted on the circuit board 102 using a bottom surface 1052 perpendicular to a Z-axis of the sensor 105. The magnetic body 104 is disposed spaced from the sensor 105. The magnetic body 104 is on an extended plane of a plane on which the sensor 105 is located. The magnetic body 104 is preferably a magnet having a south pole S and a north pole N. The sensor 105 may include a Hall effect sensor. A person skilled in the art may know that a magnetic line from the magnetic body 104 passes through the sensor 105. When the magnetic body 104 is rotated, strength and a direction of magnetic flux sensed by the sensor 105 change. This principle is used in this embodiment of the present disclosure to identify a position state of the image capture component 103. A principle will be described in detail later.

The control unit 106 is preferably a microprocessor, and is a control center of the entire mobile phone 100. The control unit 106 is electrically connected to the image capture component 103 and the sensor 105. According to a specified rule, when the magnetic flux detected by the sensor 105 satisfies a condition, the sensor 105 outputs a preset signal, for example, a high level or a low level, to a control unit 106. In this way, the control unit 106 may determine the position state of the image capture component 103 according to the received signal. Further, when the image capture component 103 is in a front-facing state, the control unit 106 may output an image-rotating instruction, for example, sending the instruction to an image processing unit. In this way, an image seen by a user is an upright image.

A person skilled in the art may understand that the mobile phone 100 may further include a display screen 107 on a front surface, and another component such as a battery not shown in FIGS. 1 and 2. Details are not described herein.

For ease of understanding, the "front-facing position," "rear-facing position," "front-facing state," and "rear-facing state" of the image capture component are described below.

Figure 3:
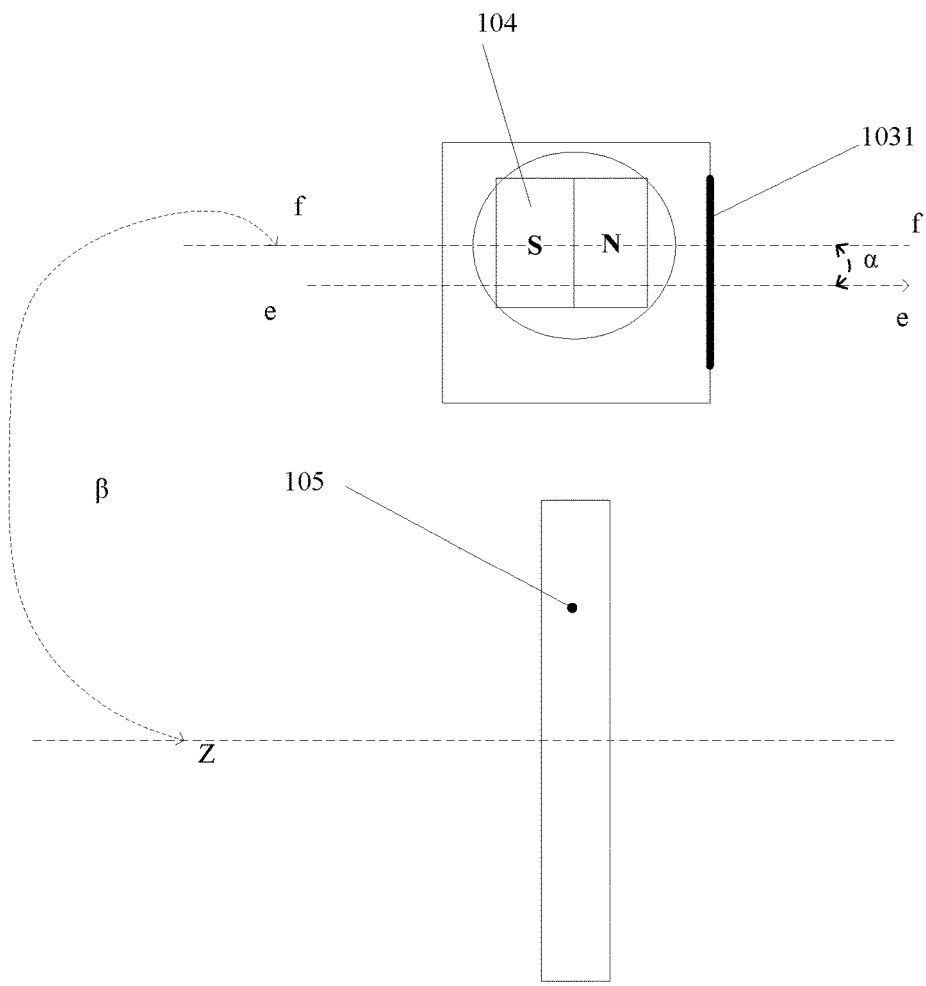
FIG. 3 is a schematic diagram showing that the terminal device of Embodiment 1 is at a front-facing position.
Figure 4:
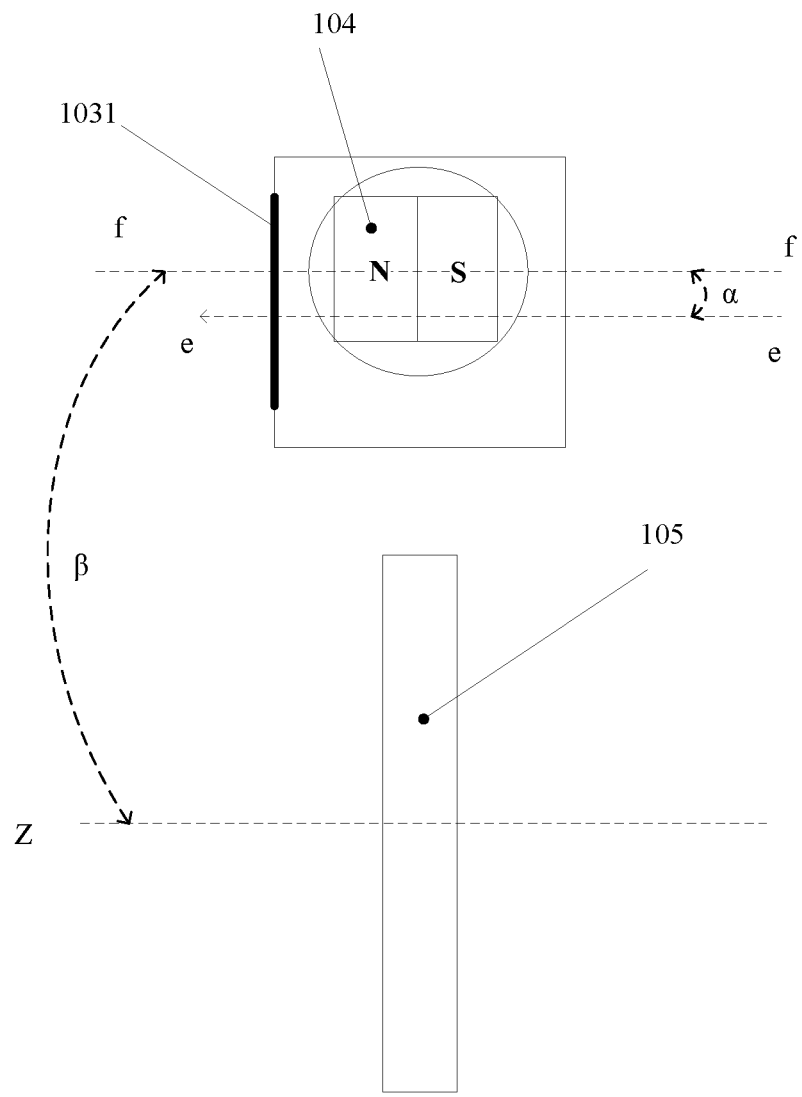
FIG. 4 is a schematic diagram showing that the terminal device of Embodiment 1 is at a rear-facing position.

In this embodiment of the present disclosure, a position of the image capture component 103 in FIG. 1 to FIG. 3 may be referred to as the front-facing position. In this case, a radial line e-e of the image capture unit 1031 is approximately perpendicular to the mobile phone 100 (or is approximate parallel to the Z-axis of the circuit board 102). In addition, the image capture unit 1031 is rotated to a front surface side of the mobile phone 100 (or a side on which the display screen 107 is located). Correspondingly, the position of the image capture component 103 in FIG. 4 may be referred to as the rear-facing position. In this case, the radial line e-e of the image capture unit 1031 is approximately perpendicular to the mobile phone 100 (or is approximate parallel to the Z-axis of the circuit board 102). In addition, the image capture unit 1031 is on a rear surface side of the mobile phone 100 (or a side opposite to the display screen 107). Compared with the front-facing position in FIG. 1 to FIG. 3, the rear-facing position in FIG. 4 is rotated by 180 degrees exactly.

The front-facing state and the rear-facing state are sets of multiple positions. According to a setting, when the image capture component 103 is rotated to any position within a range of a preset rotation angle away from the front-facing position, it is referred to as that the image capture component 103 is in the front-facing state. Correspondingly, when the image capture component 103 is rotated to any position within a range of a preset rotation angle away from the rear-facing position, it is referred to as that the image capture component 103 is in the rear-facing state. This is based on the following consideration. When photographing, a user captures an image not only using the front-facing position and the rear-facing position, but also by rotating the image capture component 103 by a particular angle. In this case, the mobile phone 100 still needs to determine a position of the image capture component 103. For example, although the position of the image capture component 103 is 10 degrees away from the front-facing position, if a captured image is not processed, the output image is still upside-down. Therefore, it needs to be specified that the mobile phone 100 also regards this position as the front-facing position. In this way, an image captured by the image capture component 103 can be rotated by 180 degrees to become an upright image.

In this embodiment of the present disclosure, the position of the magnetic body 104 is determined by detecting the magnetic flux of the magnetic body 104, and the position of the image capture component 103 is further determined. Therefore, rotation of the magnetic body 104 is preferably in synchronization with rotation of the image capture component 103. That is, the position of the magnetic body 104 in a rotation direction is preferably consistent with the position of the image capture component 103 in the rotation direction. Therefore, referring to FIG. 3 and FIG. 4, when the image capture component 103 is at the front-facing position or the rear-facing position, a connection line f-f between the south pole S and the north pole N of the magnetic body 104 is approximately parallel to a radial line e-e of the image capture unit 1031. An angle α between the connection line f-f, which connects the south pole S and the north pole N of the magnetic body 104, and the radial line e-e of the image capture unit 1031 in the rotation direction is approximately 0 degree.

In addition, referring to FIG. 1 to FIG. 3, in this embodiment, when the image capture component 103 is at the front-facing position, in a direction of a section line direction A-A in FIG. 1, settings of the south pole S and the north pole N of the magnetic body 104 enable a magnetic line to clockwise pass through the sensor 105 (the magnetic line is not shown). When the image capture component 103 is at the rear-facing position, in the direction of the section line A-A in FIG. 1, the settings of the south pole S and the north pole N of the magnetic body 104 enable the magnetic line to counterclockwise pass through the sensor 105 (the magnetic line is not shown).

A working principle is briefly described below.

Referring to FIG. 4, FIG. 4 is a diagram of a change in the magnetic flux that is sensed by the sensor 105 and that is generated by the magnetic body 104 rotating together with the image capture component 103, when the image capture component 103 is rotated from the rear-facing position to the front-facing position. The following points need to be explained.

1. A value of the magnetic flux is assumed, and does not constitute any limitation.

2. It is specified that in the rotation direction, the angle between the connection line f-f, which connects the south pole S and the north pole N of the magnetic body 104, and the Z-axis of the sensor 105 is referred to as a rotation angle β for short.

Referring to FIG. 3 and FIG. 4, when the image capture component 103 is at the rear-facing position, the connection line f-f between the south pole S and the north pole N of the magnetic body 104 is approximately parallel to the Z-axis of the sensor 105, and the rotation angle β is 0 degree. When the image capture component 103 is clockwise rotated to be at the front-facing position, the connection line f-f between the south pole S and the north pole N of the magnetic body 104 is approximately parallel to the Z-axis of the sensor 105, and the rotation angle β is 180 degrees.

Referring to FIG. 4, when the image capture component 103 is clockwise rotated from the rear-facing position to the front-facing position, the rotation angle increases from 0 degree to 180 degrees, and the magnetic flux sensed by the sensor 105 gradually increases from −4000 to 4000 unidirectionally. Using the correspondence, a person skilled in the art may specify that, for example, the magnetic flux 0 is used as a threshold. When the magnetic flux sensed by the sensor 105 is less than 0, the magnetic body 104 is at the rear-facing position or at a position with an angle less than 90 degrees relative to the rear-facing position. The sensor 105 sends a signal to the control unit 106, for example, a low level. In this way, the control unit 106 determines that the image capture component 103 is in the rear-facing state. When the magnetic flux sensed by the sensor 105 is greater than 0, the magnetic body 104 is at the front-facing position or at a position with an angle greater than or equal to 90 degrees relative to the front-facing position. The sensor 105 sends a signal to the control unit 106, for example, a high level. In this way, the control unit 106 determines that the image capture component 103 is in the rear-facing state. After determining a position state of the image capture component, the control unit 106 may perform corresponding processing.

In this embodiment of the present disclosure, a size between a top surface 1051 shown in FIG. 2 and a bottom surface 1052 of the sensor 105 is the smallest. When the sensor 105 is mounted on the circuit board 102 using the bottom surface 1052, even if the mobile phone 100 is ultrathin, the sensor 105 may still be mounted in the mobile phone 100. It is completely unnecessary to increase a thickness size of the mobile phone 100. In addition, the magnetic body 104 is disposed at the end of the connector 1032. Space reserved for the connector 1032 in structure space of the mobile phone 100 may be fully used. No particular space needs to be reserved in the mobile phone 100 for the magnetic body 104. Further, when the sensor 105 is mounted on the circuit board 102 using the bottom surface 1052, the bottom surface 1052 of the sensor 105 may be electrically connected to the circuit board 102 using, for example, a pad directly. In this way, no addition component such as a flexible circuit board needs to be used. This not only saves structure space reserved for the flexible circuit board but also reduces costs. In this way, even if the mobile phone 100 has limited structure space, the mobile phone 100 may still identify the position state of the image capture component using a cooperation relationship between the magnetic body and the sensor.

It should be additionally noted the following.

1. Although in this embodiment of the present disclosure, the magnetic body 104 is disposed at the end of the connector 1032, the connector 1032 may be set to a hollow structure to dispose the magnetic body 104 in the connector 1032.

2. The front-facing position and the rear-facing position, and the front-facing state and the rear-facing state are relative concepts. After learning a basic principle, a person skilled in the art may define the front-facing position, the rear-facing position, the front-facing state, the rear-facing state according to needs.

3. In this embodiment of the present disclosure, the settings of the south pole S and the north pole N of the magnetic body 104 are described in FIG. 1 to FIG. 4, but it is merely an example. A person skilled in the art may interchange the settings of the south pole S and the north pole N, and the only difference is that polarities of the magnetic flux are opposite. A principle is similar, and details are not described herein again.

4. In this embodiment of the present disclosure, although in the direction of the section line A-A in FIG. 2, the angle between the connection line f-f, which connects the south pole S and the north pole N of the magnetic body 104, and the radial line e-e of the image capture unit 1031 is approximately 0 degree in the rotation direction, a person skilled in the art may understand that the foregoing angle may be set to a value less than a preset value. In addition, "approximately parallel," "approximately perpendicular," and the like described in this embodiment of the present disclosure do not represent being absolutely "parallel" and "perpendicular." A deviation within a proper range may be allowed.

5. When a working principle is described in this embodiment of the present disclosure with reference to FIG. 4, merely the case in which the image capture component 103 is clockwise rotated from the rear-facing position to the front-facing position is described. However, a person skilled in the art may understand that when the image capture component 103 is counterclockwise rotated from the rear-facing position to the front-facing position, a status of the rotation angle is similar and is omitted herein.

Embodiment 2

Content of this embodiment of the present disclosure the same as or similar to that of Embodiment 1 is not described herein again, and mutual reference may be made between the two embodiments.

In Embodiment 1, during description of determining a position state of the image capture component 103 using a specified magnetic flux threshold, a single threshold manner is used. However, although the position state of the image capture component 103 may be identified in such a manner, there is room for improvement.

Figure 5:
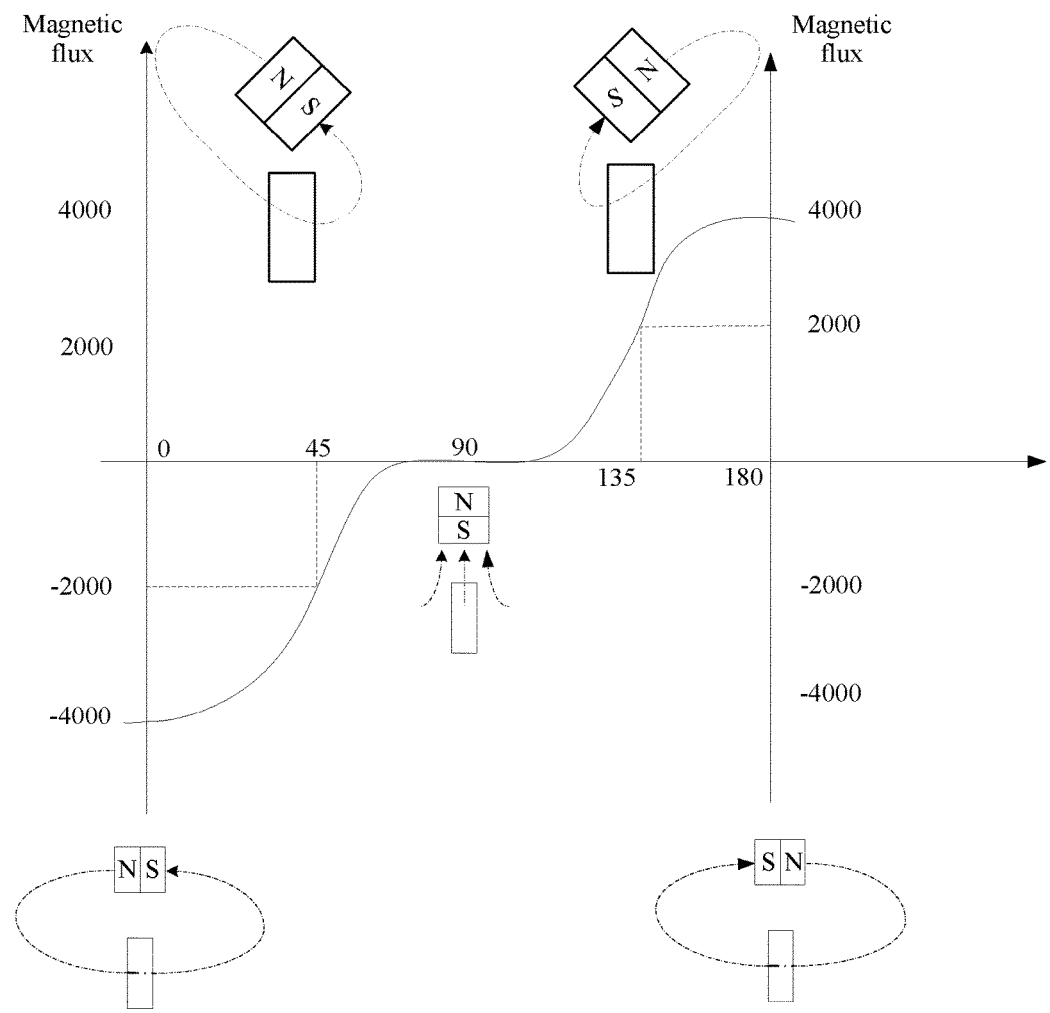
FIG. 5 is a schematic diagram of a change in magnetic flux generated during rotation of a magnetic body in Embodiment 1.

First, determining of the position state is not proper enough. Referring to FIG. 5, if magnetic flux 0 is used as a threshold (corresponding to 90 degrees), when the image capture component 103 is rotated from a rear-facing position to, for example, 85 degrees, the control unit 106 determines, according to a rule, that the image capture component 103 is in a rear-facing state. However, in fact, the position is usually not the rear-facing state expected by a user. To avoid the disadvantage, if magnetic flux −2000 is used as the threshold (corresponding to 45 degrees), when the image capture component 103 is rotated from the rear-facing position to, for example, 55 degrees, the control unit 106 determines, according to the rule, that the image capture component 103 is in a front-facing state. However, in fact, the position is usually not the front-facing state expected by the user either.

Second, a ping-pong effect may occur, thereby increasing power consumption. For example, when a user is walking or running, and the mobile phone 100 is in a mobile bumpy state, if the image capture component 103 is at a position adjacent to and corresponding to a single threshold, the position states may be constantly switched back and forth. This is referred to as the ping-pong effect. For example, referring to FIG. 5, if the magnetic flux 0 is used as the threshold (corresponding to 90 degrees), while the image capture component 103 is at the position of 90 degrees, the image capture component 103 may be rotated back and forth within a small amplitude around 90 degrees while the mobile phone 100 is bumping and moving. In this way, the image capture component 103 is frequently switched between the front-facing state and the rear-facing state. The control unit 106 frequently gives an image-rotating instruction, obviously increasing unnecessary power consumption of the mobile phone 100.

Therefore, this embodiment of the present disclosure is improved to resolve the foregoing disadvantage.

A sensor in this embodiment of the present disclosure includes a first output terminal and a second output terminal. When the magnetic flux generated by a magnetic body is greater than or equal to a first threshold, the first output terminal of the sensor outputs a first level. When the magnetic flux generated by the magnetic body is less than or equal to a second threshold, the second output terminal of the sensor outputs a second level.

Figure 6:
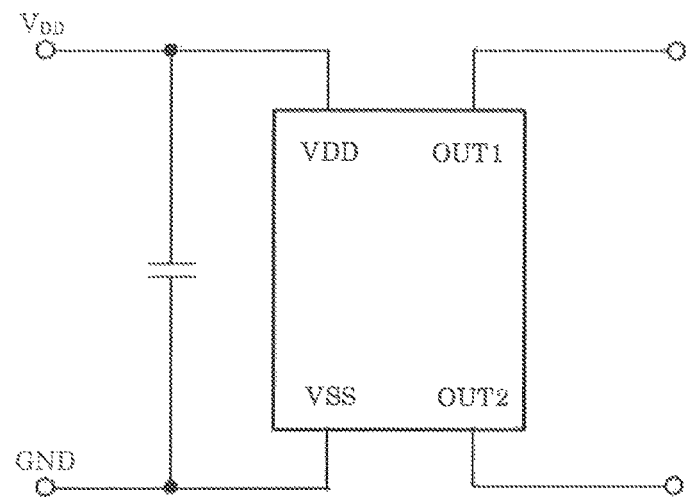
FIG. 6 is a schematic structural diagram of a sensor according to Embodiment 2.

The sensor in this embodiment of the present disclosure may be a bipolar Hall sensor. FIG. 6 shows a typical bipolar Hall sensor, the sensor may identify magnetic lines passing through along two directions, and includes two output terminals, OUT1 and OUT2. In addition, VDD is a power terminal, GND is a ground terminal, and details are not described herein. Referring to FIG. 6, when the magnetic flux sensed by the sensor is greater than or equal to a value, the OUT1 changes to a low level. When the magnetic flux sensed by the sensor is less than or equal to a value, the OUT2 changes to a low level.

Figure 7A:
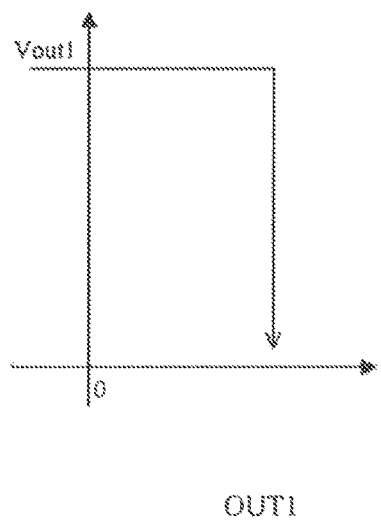
FIGS. 7A and 7B are schematic diagrams of an output of the sensor according to Embodiment 2.
Figure 7B:
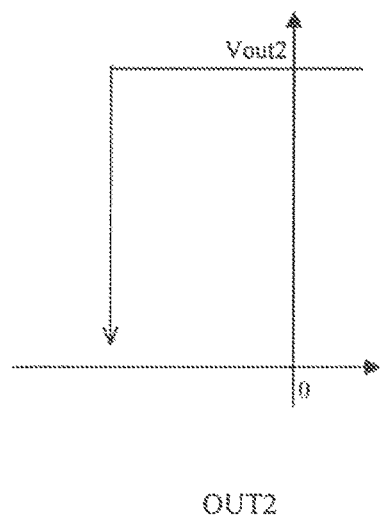

A working principle of this embodiment of the present disclosure is described below with reference to FIG. 4 and FIGS. 7A and 7B.

According to a rule, magnetic flux 2000 and −2000 may be selected to serve as the first threshold and the second threshold. If the magnetic flux is less than 2000, the first output terminal outputs a high level. If the magnetic flux is greater than or equal to 2000, the first output terminal outputs a low level. If the magnetic flux is less than or equal to −2000, the second output terminal outputs a low level. If the magnetic flux is greater than −2000, the second output terminal outputs a high level. The control unit 106 detects level outputs of the first output terminal and the second output terminal. When the first output terminal outputs a low level, the control unit 106 determines that the image capture unit 103 is in the front-facing state. When the second output terminal outputs a low level, the control unit 106 determines that the image capture unit 103 is in the rear-facing state.

Figure 8:
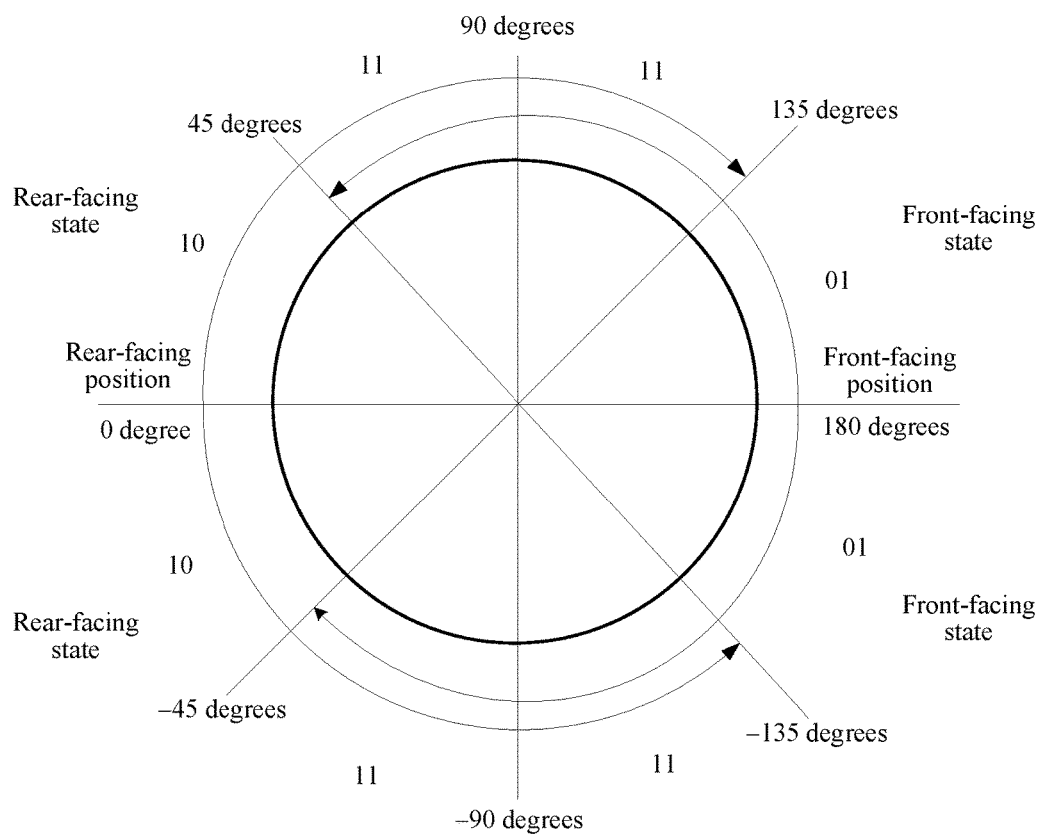
FIG. 8 is a schematic diagram of a principle of identifying, by a terminal device, a position state of an image capture component according to Embodiment 2.

A working process is further described with reference to FIGS. 7A, 7B and 8. It should be noted that first, a two-digit number shown in FIG. 8 is formed by 1 and 0 in FIGS. 7A and 7B, 1 represents a high level, and 0 represents a low level. A first digit represents the first output terminal OUT1, and a second digit represents the second output terminal OUT2. Second, when a value relationship of magnetic flux is determined, whether a value is positive or negative needs to be considered. For example, −1000 is greater than −2000, and 2000 is greater than −2000.

A. Referring to FIG. 8, when the image capture component 103 is at the rear-facing position, according to FIG. 5 the rotation angle is 0 degree, and the magnetic flux is −4000 according to FIG. 5. According to the rule, −4000 is less than the first threshold 2000, and the first output terminal OUT1 outputs a high level 1, −4000 is less than the second threshold −2000, and the second output terminal OUT2 outputs a low level 0. The control unit 106 monitors that the second output terminal OUT2 outputs the low level 0, and determines that the image capture component 103 is in the rear-facing state.

B. Referring to FIG. 8, when the image capture component 103 is clockwise rotated from the rear-facing position to 135 degrees or is counterclockwise rotated to −135 degrees, according to FIG. 5 the magnetic flux is 2000. According to the rule, 2000 is equal to the first threshold 2000, and the first output terminal OUT1 outputs a low level 0, 2000 is greater than the second threshold −2000, the second output terminal OUT 2 outputs a high level 1. The control unit 106 monitors that the first output terminal OUT1 outputs the low level 0, and determines that the image capture component 103 is in the front-facing state.

C. Referring to FIG. 8, when the image capture component 103 is at a front-facing position, according to FIG. 5 the rotation angle is 180 degrees, and the magnetic flux is 4000. According to the rule, 4000 is greater than the first threshold 2000, and the first output terminal OUT1 outputs a low level 0, 4000 is greater than the second threshold −2000, and the second output terminal OUT2 outputs a high level 1. The control unit 106 monitors that the first output terminal OUT1 outputs the low level 0, and determines that the image capture component 103 is in the front-facing state.

D. Referring to FIG. 8, when the image capture component 103 is rotated from the front-facing position to 45 degrees or −45 degrees, according to FIG. 5 the magnetic flux is −2000. According to the rule, −2000 is less than the first threshold, and the first output terminal OUT1 outputs a high level 1, −2000 is equal to the second threshold −2000, and the second output terminal OUT1 outputs a low level 0. The control unit 106 monitors that the second output terminal OUT2 outputs the low level 0, and determines that the image capture component 103 is in the rear-facing state.

For an angle interval in which both the first output terminal OUT1 and the second output terminal OUT2 in FIG. 6 output a high level 1, because there is no low level, the control unit 106 considers that the image capture component 103 keeps an original position state unchanged. During startup, if the image capture component 103 is in the angle interval in which both the first output terminal OUT 1 and the second output terminal OUT 2 in FIG. 6 output the high level 1, the control unit 106 may consider, by default that the image capture component 103 is in the rear-facing state.

In this embodiment of the present disclosure, because the sensor 105 has two output terminals, two thresholds may be set to determine the position state of the image capture component. Advantages are as follows.

First, determining of the position state is more proper. In this embodiment of the present disclosure, a position obtained after rotation within an angle of 45 degrees based on the front-facing position is determined as the front-facing state, and a position obtained after rotation within an angle 45 degrees based on the rear-facing position is determined as the rear-facing state. This is obviously more proper.

Second, the ping-pong effect is avoided, and power consumption is reduced. For example, the image capture component 103 is rotated back and forth within a small amplitude around 45 degrees. In this case, when the rotation angle is slightly less than 45 degrees, the first output terminal OUT 1 outputs a low level 0, and the image capture component 103 is determined to be in the rear-facing state. When the rotation angle is slightly greater than 45 degrees, both the first output terminal OUT 1 and the second output terminal OUT 2 output a high level 1, and the image capture component 103 is still determined to be in the rear-facing state. Therefore, frequent switching of the image capture component between the front-facing state and the rear-facing state does not occur, preventing the control unit 106 from frequently giving an image-rotating instruction, and obviously reducing power consumption of the mobile phone 100.

It is easy to understand the following.

1. Selection of a threshold in this embodiment of the present disclosure is for ease of understanding, but does not constitute any limitation to the present disclosure.

2. When the magnetic flux reaches a threshold, the high level or the low level output by the first output terminal and the second output terminal is also merely an example. A person skilled in the art may properly select a high level or a low level according to needs.

3. In this embodiment of the present disclosure, if the magnetic flux is greater than or equal to the first threshold, the first output terminal outputs the low level, and if the magnetic flux is less than or equal to the second threshold, the second output terminal outputs the low level. However, a value relationship between the magnetic flux and the threshold is merely an example, and may be preset according to needs.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A terminal device, comprising:
a device housing;
a circuit board disposed in the device housing;
an image capture component comprising an image capture circuit configured to capture image data, wherein an end of the image capture component has a connector, wherein the connector is pivotally coupled to the device housing, and wherein the image capture component is rotatable between a rear-facing position and a front-facing position relative to the device housing using the connector;
a magnetic body disposed in the connector or at an end of the connector, wherein the magnetic body comprises a south pole and a north pole;
a sensor mounted on the circuit board and disposed proximate to the magnetic body and is configured to:
sense magnetic flux generated when the magnetic body is rotated; and
output a preset signal based on the magnetic flux; and
a processor electrically coupled to the image capture component and the sensor and configured to determine, according to the preset signal output by the sensor, whether the image capture component is in a rear-facing state or a front-facing state,
wherein a first output terminal of the sensor is configured to output a first level when the magnetic flux generated by the magnetic body is greater than or equal to a first threshold, the processor is further configured to determine that the image capture component is in the front-facing state when identifying the first level output by the first output terminal of the sensor, and
wherein a second output terminal of the sensor is configured to output a second level when the magnetic flux generated by the magnetic body is less than or equal to a second threshold, wherein the first threshold is greater than the second threshold, the processor is further configured to determine that the image capture component is in the rear-facing state when identifying the second level output by the second output terminal of the sensor.

2. The terminal device according to claim 1, wherein when the image capture component is in the front-facing state, the processor is further configured to provide an image-rotating instruction.

3. The terminal device according to claim 1, wherein the sensor comprises a bipolar Hall sensor.

4. The terminal device according to claim 1, wherein the sensor is mounted on the circuit board using a pad.

5. A camera state switching method, applied to a terminal device having a camera, comprising:

sensing, using a sensor, magnetic flux generated when a magnetic body is rotated, wherein the terminal device further comprises a device housing, an image capture component, the magnetic body, and the sensor, wherein the image capture component comprises an image capture circuit configured to capture image data, wherein an end of the image capture component has a connector pivotally coupled to the device housing, wherein the image capture component is rotatable between a rear-facing position and a front-facing position relative to the device housing using the connector, wherein the magnetic body is disposed in the connector or at an end of the connector;
outputting, by a first output terminal of the sensor, a first level when the magnetic flux generated by the magnetic body is greater than or equal to a first threshold;
determining that the image capture component is in a front-facing state when the first output terminal of the sensor outputs the first level;
outputting, by a second output terminal of the sensor, a second level when the magnetic flux generated by the magnetic body is greater than or equal to a second threshold, wherein the first threshold is greater than the second threshold; and
determining that the image capture component is in a rear-facing state when the second output terminal of the sensor outputs the second level.

6. The method according to claim 5, further comprising providing an image-rotating instruction when the image capture component is in the front-facing state.

7. A computer program product comprising a non-transitory computer readable storage medium storing one or more programs which when executed by a terminal device having a camera, cause a method that comprises:

sensing, using a sensor, magnetic flux generated when a magnetic body is rotated, wherein the terminal device further comprises a device housing, an image capture component, the magnetic body, and the sensor, wherein the image capture component comprises an image capture circuit configured to capture image data, wherein an end of the image capture component has a connector pivotally coupled to the device housing, wherein the image capture component is rotatable between a rear-facing position and a front-facing position relative to the device housing using the connector, wherein the magnetic body is disposed in the connector or at an end of the connector;
outputting, by a first output terminal of the sensor, a first level when the magnetic flux generated by the magnetic body is greater than or equal to a first threshold;
determining that the image capture component is in a front-facing state when the first output terminal of the sensor outputs the first level;
outputting, by a second output terminal of the sensor, a second level when the magnetic flux generated by the magnetic body is greater than or equal to a second threshold, wherein the first threshold is greater than the second threshold; and
determining that the image capture component is in a rear-facing state when the second output terminal of the sensor outputs the second level.

8. The computer program product according to claim 7, further comprising providing an image-rotating instruction when the image capture component is in the front-facing state.

* * * * *